(12) United States Patent
Milicevic et al.

(10) Patent No.: US 11,407,670 B2
(45) Date of Patent: Aug. 9, 2022

(54) DEVICE, SYSTEM, AND METHOD FOR FORMING A CORE-ROD FOR OPTICAL FIBERS

(71) Applicant: Draka Comteq B.V., Delft (NL)

(72) Inventors: Igor Milicevic, Helmond (NL); Gertjan Krabshuis, Sint Oedenrode (NL); Mattheus Jacobus Nicolaas Van Stralen, Tilburg (NL); Raoul Hens, Eersel (NL)

(73) Assignee: Draka Comteq B.V., Delft (NL)

( * ) Notice: Subject to any disclaimer, the term of this patent is extended or adjusted under 35 U.S.C. 154(b) by 423 days.

(21) Appl. No.: 16/419,429

(22) Filed: May 22, 2019

(65) Prior Publication Data

US 2019/0359516 A1 Nov. 28, 2019

(30) Foreign Application Priority Data

May 23, 2018 (NL) ..................................... 2020974

(51) Int. Cl.
 *C03B 37/012* (2006.01)
(52) U.S. Cl.
 CPC .. *C03B 37/01245* (2013.01); *C03B 37/01248* (2013.01); *C03B 37/01257* (2013.01)
(58) Field of Classification Search
 CPC .............. C03B 37/0124; C03B 23/043; C03B 37/01248; C03B 37/01245; C03B 37/01257
 See application file for complete search history.

(56) References Cited

U.S. PATENT DOCUMENTS

| 715,509 | A | * | 12/1902 | Potter | ..................... | H05B 3/60 |
| | | | | | | 373/126 |
| 4,142,063 | A | * | 2/1979 | Boniort | ................. | C03B 37/029 |
| | | | | | | 373/140 |

(Continued)

FOREIGN PATENT DOCUMENTS

| CN | 1082516 A | 2/1994 |
| CN | 1267369 A | 9/2000 |

(Continued)

OTHER PUBLICATIONS

Notification of Decision to Grant Patent Right in counterpart Chinese Application No. 201910429934.X dated Apr. 26, 2022, pp. 1-5.

*Primary Examiner* — Cynthia Szewczyk
(74) *Attorney, Agent, or Firm* — Additon, Pendleton & Witherspoon, P.A.

(57) ABSTRACT

The invention relates to a device, system, and method for forming a core-rod for optical fibers by collapsing a tube comprising deposited layers of silica to form the core-rod. The device comprises an elongate cavity, an elongate cylindrical carbon liner bounding the cavity, the liner connecting to a frame of the device at opposing end portions, a heating element in a heating element space, surrounding the liner, the liner separating the heating element space from the cavity, a ring of a refractory material, fixated to the frame, surrounding a part of a length of the cavity, the liner being provided such that an inner surface portion at a first end portion of the liner mates with a cylindrical outer surface portion of the ring such that the liner can axially move with the first end portion thereof along the outer surface portion of the ring.

19 Claims, 2 Drawing Sheets

(56) References Cited

U.S. PATENT DOCUMENTS

| | | | | |
|---|---|---|---|---|
| 4,547,644 A | * | 10/1985 | Bair | C03B 37/029 219/634 |
| 4,609,532 A | * | 9/1986 | Schramm | B01J 12/005 422/145 |
| 4,969,941 A | * | 11/1990 | Kyoto | C03B 37/0146 65/391 |
| 5,240,488 A | | 8/1993 | Chandross et al. | |
| 5,379,364 A | | 1/1995 | Chandross et al. | |
| 5,970,083 A | * | 10/1999 | Orcel | C03B 23/043 373/141 |
| 6,138,481 A | * | 10/2000 | Saito | C03B 23/043 117/215 |
| 6,546,760 B1 | * | 4/2003 | Tsuchiya | C03B 37/029 65/537 |
| 6,584,808 B1 | | 7/2003 | Roba et al. | |
| 6,600,769 B2 | * | 7/2003 | Simons | C03B 37/0124 373/157 |
| 7,566,221 B2 | * | 7/2009 | Garcia | F27B 5/16 432/115 |
| 2005/0144983 A1 | * | 7/2005 | Nakanishi | C03B 37/01257 65/379 |
| 2006/0174659 A1 | | 8/2006 | Ganz et al. | |
| 2006/0207293 A1 | | 9/2006 | Sowa et al. | |
| 2008/0271495 A1 | | 11/2008 | Balakrishnan et al. | |
| 2012/0324958 A1 | | 12/2012 | Yang et al. | |

FOREIGN PATENT DOCUMENTS

| | | |
|---|---|---|
| CN | 1823020 A | 8/2006 |
| CN | 101657389 A | 2/2010 |
| CN | 103359927 A | 10/2013 |
| JP | 55020249 A | 2/1980 |
| WO | 02/40415 A1 | 5/2002 |
| WO | 2010029147 A1 | 3/2010 |
| WO | 2012006905 A1 | 1/2012 |

* cited by examiner

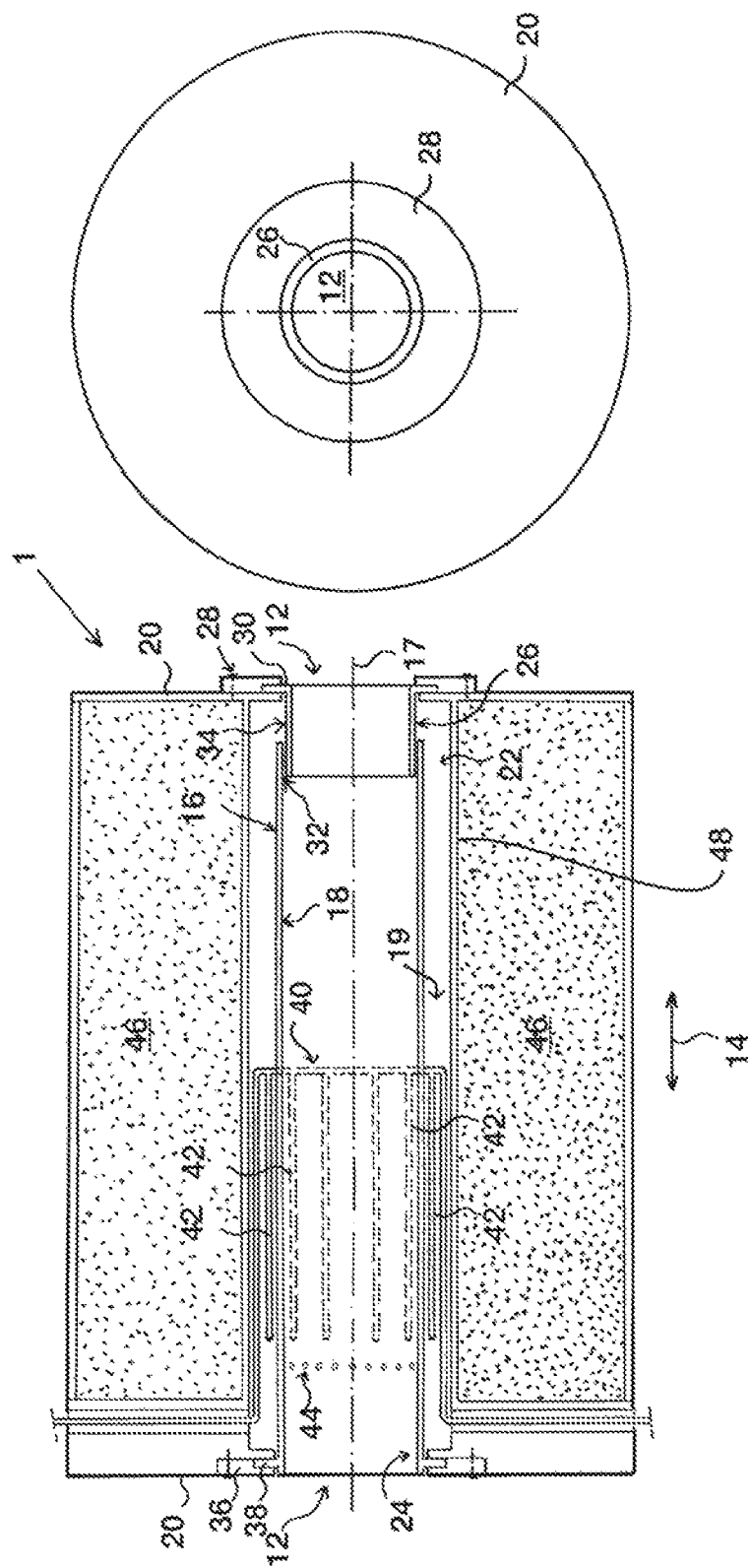

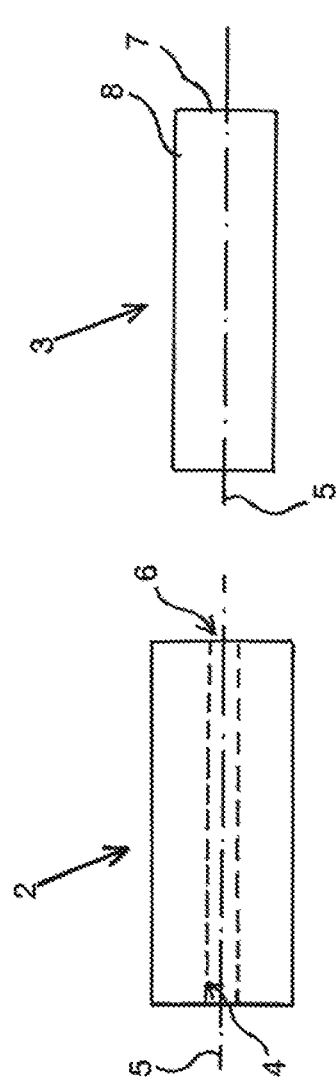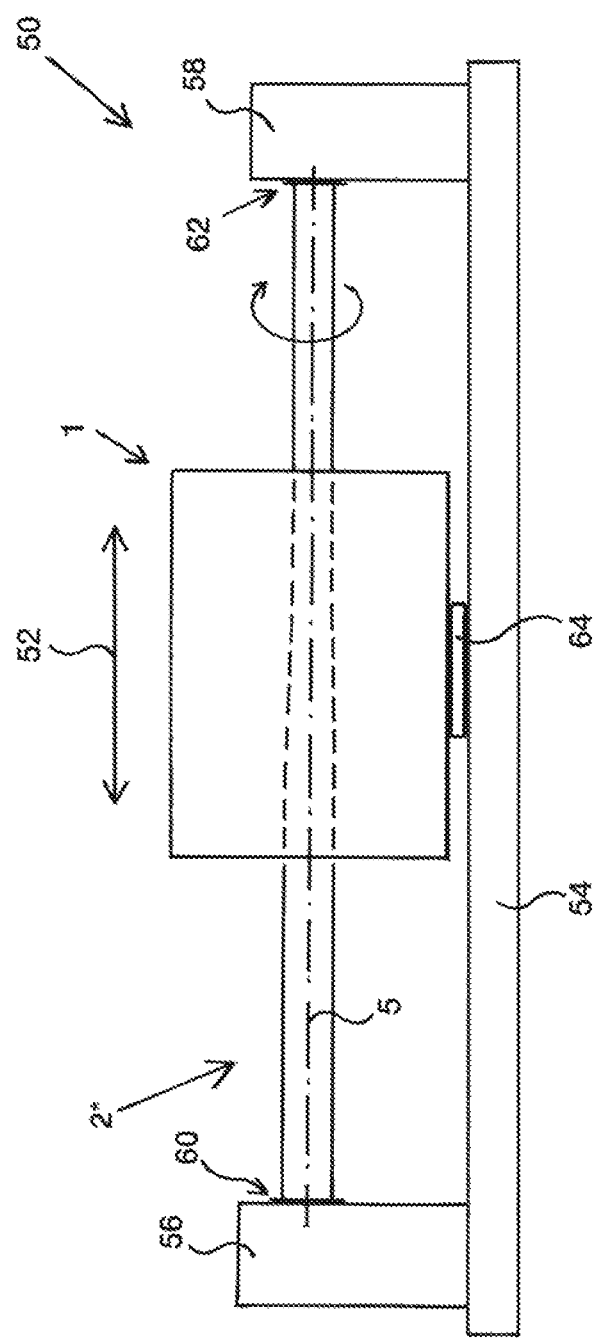

DEVICE, SYSTEM, AND METHOD FOR FORMING A CORE-ROD FOR OPTICAL FIBERS

CROSS-REFERENCE TO PRIORITY APPLICATION

This application claims the benefit of pending Dutch Application No. 2020974 (filed May 23, 2018, at the Netherlands Patent Office), which is hereby incorporated by reference in its entirety.

FIELD OF THE INVENTION

The present invention relates to a device, system, and method for forming a core-rod for optical fibers.

BACKGROUND

Applicant's International Publication No. WO 02/40415 A1 (published May 23, 2002), which is hereby incorporated by reference in its entirety, discloses an apparatus and process for producing an optical fiber core-rod. In use of the apparatus, it appears that the stability over time of the process, and the related deterioration of components of the apparatus related to the liner, or, the inner wall of the furnace as referred to in International Publication No. WO 02/40415 A1, may be improved. In this respect, it is noted that the liner is exposed to high temperatures which may exceed 2000° C., as generated by the heater in order to locally melt glass.

SUMMARY

The present teaching relates to the field of manufacturing optical fibers by means of chemical vapor deposition (CVD) in which layers of silica are deposited on a substrate; examples thereof are modified chemical vapor deposition (MCVD), plasma-enhanced chemical vapor deposition (PECVD or PCVD), and outside vapor deposition (OVD).

A tube having deposited layers of glass, such as by means of PCVD, is transferred to a device for forming a core-rod. Such a device is also called a collapsing lathe, or a glass-working lathe. The function of the collapsing is to form a core-rod from the tube. While a tube having the deposited layers of glass still has a central through hole, the core-rod does not. This is a result of locally heating the tube beyond the melting temperature thereof. When the glass starts to melt, the tube assumes a smaller diameter due to the surface tension. This local heating process is carried out until the central hole in the tube is totally closed; then, the forming of the core-rod is completed. During the heating, the device and the tube move in reciprocating manner along each other so that the device heats the tube locally, but over time along the entire length of the tube.

It is an exemplary object of the present invention to provide a device for forming a core-rod for optical fibers, having a high durability of in particular the liner and being equipped to operate in a stable manner over time.

In an exemplary aspect, the present invention relates to a device for forming a core-rod for optical fibers. The device is arranged for collapsing a tube comprising deposited layers of silica, to form the core-rod. The device comprises:

an elongate cavity extending in an axial direction of the device;
an elongate cylindrical liner made of carbon, typically graphite, extending in the axial direction and bounding the cavity with a cylindrical wall thereof. The liner connects to a frame of the device at opposing end portions of the liner;
a heating element, the heating element being provided in an annular heating element space, said heating element surrounding at least a part of the liner. The cylindrical wall of the liner separates the heating element space from the cavity;
a ring made of a refractory material, fixated to a frame of the device. The ring surrounds a part of a length of the cavity.

The liner is provided such that a cylindrical inner surface portion of the liner at a first end portion of the opposing end portions of the liner mates with a cylindrical outer surface portion of the ring such that the liner can axially move with the first end portion thereof along the outer surface portion of the ring.

In use of the device, a tube comprising deposited layers of silica may be provided such that it extends through the cavity; that is, it extends from outside the device on a first side, through the device, or at least through the cavity, to outside the device on a second, opposing side. Thus, the cavity, or, passage, through the device, is arranged for allowing the tube to extend through the cavity in use, typically concentric with the liner. The heating element is for heating the tube in use, that is, while the tube extends through the cavity. The heating element is configured to locally heat the tube so that it collapses to form the core-rod in use. The heating element is provided concentric with respect to the liner; that is, it is provided in the annular heating element space, surrounding the liner, so that it may uniformly heat the tube in use.

In another exemplary aspect, the present invention relates to a system for forming a core-rod for optical fibers, the system being arranged for collapsing a tube comprising deposited layers of silica, to form the core-rod in use, wherein the system comprises a device for forming a core-rod according to the present invention. The system further comprises a moving device configured for moving the tube and the device with respect to each other in a reciprocating manner in the axial direction.

In another exemplary aspect, the present invention relates to a method for forming a core-rod for optical fibers using a system according to the present invention, the system comprising a device according to the present invention, the method comprising:

providing a tube comprising deposited layers of silica,
holding the tube at two opposed end portions thereof, and such that the tube extends through the cavity of the device,
heating the tube locally beyond the melting temperature by means of generating heat using the heating element of the device,
moving the tube and the device with respect to each other in a reciprocating manner in the axial direction of the device.

An exemplary device according to the present invention has a liner which is provided such that its inner surface mates with an outer surface of the ring made of the refractory material and it may axially move with the first end portion thereof along the outer surface portion of the ring. An effect is that an edge of the liner at the first end portion, generally susceptible to deterioration because of exposure to burning, is outside the cavity through which the tube extends. By this is meant that said edge is on the outer side of the ring, thus protected by the ring and not exposed within the cavity. As a result, this edge is less susceptible to burning effects which would lead to a swift deterioration of the liner. Also the liner can freely move along the ring as a result of axial expansion of the liner under the high temperatures during the heating process, that is, in the absence of axial forces being exerted on the liner which would be detrimental to the durability and would lead to damage of the liner in particular at said edge of the liner at the first end portion. The axial expansion at temperatures of about 2000° C. may be as much as 30 to 60 millimeters per meter length. A typical length of the liner is between 100 and 500 millimeters. This means that the liner shows a significant axial expansion. Further, because the inner surface of the liner mates with the outer surface of the ring, a sufficient sealing between the heating element space outside the liner, in which the heating element is located, and the inside of the liner, i.e. the cavity, is realized. In use, a non-oxidizing gas, such as argon, is forced from the heating element space outside the liner, to the cavity, and flows out of the device at the ends of the cavity. This flow of said gas prevents oxygen from entering the cavity and heating element space outside the liner, which prevents the liner and the heating element from deterioration such as burning. The inventors have found that the radial expansion under heat of the liner and the ring is quite similar, or at least such that a proper sealing is maintained during use of the device. The inventors have also found that the heating element and the liner show very stable behavior having very little deterioration over time. This leads to a highly durable device.

Described effects of the device of the invention are applicable to the system and method of the invention in an analogous manner.

Embodiments of the present invention are disclosed in the appended claims and the following detailed description. Corresponding embodiments of the device disclosed below are also applicable for the method and system according to the present invention and vice versa.

Definitions

The following definitions are used in the present description and claims to define the stated subject matter. Other terms not cited below are meant to have the generally accepted meaning in the field.

"tube comprising deposited layers of silica" as used in the present description means: an elongate tube having a cavity, i.e. central through hole, within and comprising a plurality of concentric doped or un-doped silica layers obtained by deposition.

"collapsing" as used in the present description means: contracting a tube comprising deposited layers of silica by locally heating the tube beyond the melting temperature, so that the central through hole of the tube closes and the outer diameter of the tube reduces.

"core-rod" as used in the present description means: a solid rod that is obtained by collapsing a tube comprising deposited layers of silica and comprising from the center to the periphery at least an optical core and an optical cladding.

"preform" or "final preform" as used in the present description means: an elongate cylindrical glass structure that can be directly used for drawing of optical fibers therefrom, the elongate cylindrical glass structure being a core-rod or a core-rod provided with one or more concentric glass tubes or with additional glass deposited on the outer cylindrical circumference of the core-rod.

"silica" as used in the present description means: any substance in the form of SiOx, whether or not stoichiometric, and whether or not crystalline or amorphous.

"refractory material" as used in the present description means: a material that does not decompose in oxygen containing environment and retains its strength and form, at temperatures up to 800° C.

"mates," as used in the context of "a cylindrical inner surface portion of the liner at a first end portion of the opposing end portions of the liner mates with a cylindrical outer surface portion of the ring," as used in the present description means: the cylindrical inner surface portion of the liner matches with, or, fits over, the cylindrical outer surface portion of the ring, leaving a small gap, such as of less than 2 millimeters or less than 1 millimeter such as between 0.05 and 0.4 millimeter, the liner and ring configured such that the liner can axially move with the first end portion thereof along the outer surface portion of the ring, during use of the device, including use at temperatures in the range of 0° C. to about 2300° C.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

The present invention is described hereinafter with reference to the accompanying highly schematic drawings in which embodiments of the present invention are shown and in which like reference numbers indicate the same or similar elements.

FIG. 1 shows an exemplary embodiment of a device according to the present invention, in longitudinal cross-section;

FIG. 2 shows a side view of the exemplary device of FIG. 1;

FIG. 3a shows a typical example, drawn shortened, of a tube which may be collapsed using a device according to the present invention;

FIG. 3b shows a typical example, drawn shortened, of a core-rod which may have been formed by collapsing, using a device according to the present invention, of the tube of FIG. 3a; and FIG. 4 shows, in front view, an embodiment of a system according to the present invention, comprising the device of FIG. 1.

DETAILED DESCRIPTION

As described above, in a first exemplary aspect the invention relates to a device for forming a core-rod for optical fibers. Several exemplary embodiments of said device are discussed below.

The liner of the device, at the second of the opposing end portions, may be fixated to the frame of the device, typically wherein the liner, at the second end portion, comprises a flange which is clamped to the frame of the device. Such a fixation of the liner effectively positions the liner inside the device and may also provide a gas-tight seal between the liner and the frame of the device in an easy and effective manner.

Alternatively, the device may comprise a further ring made of a refractory material, fixated to the frame of the device, the further ring surrounding a part of a length of the cavity, wherein the liner is provided such that an inner cylindrical surface portion at a second end portion of the opposing end portions mates with an outer cylindrical surface portion of the further ring such that the liner can axially move with the second end portion thereof along the outer surface portion of the further ring. In this case, the liner thus "floats," or, is suspended, on the two rings, and may thus freely move in an axial direction with both end portions thereof, such as due to thermal expansion. The ring, and/or the further ring, may have a flange which is clamped to the frame of the device.

The refractory material may be alumina or silica, typically silica. This way, the ring is highly suitable for use in the extreme temperature conditions in use of the device. Also, behavior including thermal expansion of the ring is comparable to the liner, which is made of carbon.

The liner may comprise several through holes in the cylindrical wall, typically at the same position on the wall in the axial direction, spaced apart in circumferential direction, via which holes a non-oxidizing gas may be forced from the heating element space to the cavity. The fixation of the liner and of the ring to the frame of the device may be gas-tight. Also, a frame wall part bounding the heating element space may be gas-tight. Thus, any gas is forced through the holes in the liner wall in use, although a minor amount of gas may flow through a gap between the ring and the liner, as will be explained below. The non-oxidizing gas typically comprises, or consists of, argon or helium, typically argon.

The heating element may be of the resistive type, although other types of heating elements, such as inductive heating, for example, may alternatively or in addition be used.

In an embodiment, the system may have two holding elements for holding two opposed end portions of the tube, wherein the moving device is configured for moving the device in a reciprocating manner in the axial direction, such that the device passes along the tube in use of the system. The two holding elements may be two respective rotatable chucks configured for holding and rotating the tube in use of the system. Rotation of the tube during the heating may prevent sagging of the tube.

FIG. 1 shows a device 1 which in use forms an elongate core-rod 3 for optical fibers. The core-rod 3 is cylindrical, with a central axis 5 defining its axial direction, and is formed from an elongate tube 2 having a plurality of concentric glass layers 4 obtained by deposition. Such a tube 2 is shown in FIG. 4. In FIG. 3a, the length of the tube 2 has been drawn shortened, i.e. it is not to scale. In practice, the tube may have a length of over 1 meter, or in the range of 1 to 5 meters, or be about 2 or 2.25 or 2.5 meters, for example, and may have an outer diameter in the range of 20 to 150 millimeters, such as about 45 millimeters, for example. Generally, the tube may be longer in case of larger diameters. Similarly, in FIG. 3b the length of the core-rod 3 has been drawn shortened. In practice, the core-rod 3 has a shorter length than the tube 2 from which it is formed (unless it is elongated during the collapsing) and has a reduced outer diameter of about 35 millimeters in case of a tube of 45 millimeters, for example. In another example, in case of a tube diameter of 80 millimeters, the core-rod diameter may be about 60 millimeters. While the tube 2 has a cavity, i.e. a central through hole 6, within, the core-rod 3 is a solid rod; that means, it does not have a cavity/central through hole any longer. The core-rod 3 is obtained by collapsing the tube 2 using the device 1. The core-rod 3 comprises from the center to the periphery at least an optical core 7 and an optical cladding 8.

The device 1 is arranged for collapsing a tube 2 to form the core-rod 3. To this end, the device 1 comprises an elongate cavity 12 extending in an axial direction 14 of the device 1. The cavity 12 is arranged for allowing the tube 2, which is to be collapsed so as to form a core-rod 3, to extend through the cavity 12 in use. The cavity 12 thus extends through the device 1 and forms a passage through the device. A length of the device 1, i.e. the dimension of the device extending in the axial direction 14, is smaller than the length of the tube 2 to be collapsed. The length, or better, overall scale of the device is related to the dimensions of the tube to be collapsed. The length of the device may be in the range of 150 to 600 millimeters, such as about 400 millimeters, in case of a tube of about 1.5 to 3 meters, such as the tube 2 mentioned above. The length of the tube may be more than 1 meter or even more than 2 meters, as also mentioned above.

The device 1 also has an elongate cylindrical liner 16 made of carbon, more specifically graphite, having a central axis 17. The liner 16 extends in the axial direction 14 and bounds the passage 12 with a cylindrical wall 18 thereof. The liner 16 may have a length to inner diameter ($1/d_i$) ratio in the range of 3 to 10, typically 6 to 7. That is, the length is 3 to 10 (or 6 to 7) times the inner diameter. For some tubes, such as the tube 2 described above, the inner diameter of the liner may be chosen such that there is a gap (e.g., an annular gap) between the tube and the cylindrical wall 18 of the liner 16 of about 2 to 10 millimeters, typically of about 3 to 4 millimeters. For the above-described tube of 45 millimeters, the inner diameter of the liner 16 may be 52 millimeters (thus leaving a gap of 3.5 millimeters) and the length may be about 350 millimeters. The wall thickness of the cylindrical wall 18 of the liner 16 may be between 2 and 10 millimeters, such as about 4 millimeters, for example.

The liner 16 connects to a frame 20 of the device at opposing end portions 22, 24 of the liner. To this end, the device 1 further has a ring 26 made of a refractory material, more specifically silica. The ring 26 is fixated, more specifically clamped, to the frame 20 at the location of a first 22 of the opposing end portions 22, 24 of the liner by a ring-shaped clamp 28 which may be releasably fixated to the frame 20 such as by bolts. The clamp 28 engages a flange 30 provided on the ring 26. As FIG. 1 shows, like the liner 16, the ring 26 also surrounds the cavity 12. The liner 16 is provided such that a cylindrical inner surface portion 32 of the liner 16 at the first end portion 22 mates with a cylindrical outer surface portion 34 of the ring 26 leaving an annular gap, that is, a gap along the circumference, between both in the order of tenths of a millimeter, such that the liner 16 can axially move with the first end portion thereof along the outer surface portion of the ring. The ring 26 thus forms a connection between the first end portion 22 of the liner 16 and the frame 20, or, lets the liner connect to the frame at the first end portion 22, in the absence of a fixation of the liner to the frame. As a result, the liner 16 is free to expand in the axial direction under the influence of the high temperature changes occurring as a result of use of the device. These temperature changes may exceed 2000° C., resulting in an axial expansion in the range of 10 to 20 millimeters in case of the length of about 350 millimeters in the above mentioned example. Although the thermal expansion coefficient of graphite is somewhat higher than that of silica, the radial gap between the liner 16 and the ring 26 remains acceptable, i.e. it does not become unacceptably large.

The liner 16, at the second 24 of the opposing end portions 22, 24, is fixated to the frame 20 of the device by means of a ring-shaped clamp 36, clampingly engaging a flange 38 provided on the second end portion 24 of the liner 16. As a result, the liner 16 is clamped to the frame 20 of the device 1. Thus, at the second end portion 24, the liner is positioned with respect to the frame. At this second end portion, a protection and heat dissipation sleeve (not shown) may be provided, partially protruding to inside the cavity and having an outer diameter about equal to an inner diameter of the liner at the second end portion 24. As a result of said fixation of its second end portion 24 to the frame 20, the liner 16 may freely move along the ring 26 at the first end portion, in principle without being in direct contact with the ring, although it is also possible within the scope of the present disclosure that the liner is in direct, sliding, contact with the ring 26.

In an alternative embodiment, the connection of the liner to the frame of the device using a silica ring clamped to the frame, may also be provided at the second end portion of the liner. In this case, the liner thus "floats," or, is suspended, on the two rings, and may thus freely move in an axial direction with both end portions thereof, such as due to thermal expansion, the axial movement/expansion being limited by the flanges on the rings and/or a side wall of the frame of the device to which the rings are connected. Because of the cylindrical inner surface portion of the liner at the end portions mating with the respective cylindrical outer surface portions of the rings, movement of the liner with respect to the rings in a radial direction of the liner is at least substantially prevented.

The device 1 also comprises a heating element 40 surrounding at least a part of the liner 16 in an axial direction. The heating element 40 is of the resistive type and provided in an annular space 19 surrounding the liner 16. Typically, the heating element is made of graphite and comprises a plurality of meandering elongate parts, or "fingers" along a part of the length of the liner, thereby realizing a plurality of elongate heating element parts 42 formed by the "fingers," each part 42 extending in an axial direction. The heating element 40 can thus said to be provided concentrically about the liner 16; that is, it can uniformly heat the tube 2 inside the cavity 12 for the purpose of collapsing it to form the core-rod 3. The cylindrical wall 18 of the liner separates the heating element space 19 from the through cavity 12.

The liner 16 comprises several through holes 44 in the cylindrical wall, via which holes 44 a non-oxidizing gas may flow from the heating element space 19 on an outer side of the liner 16 to the cavity 12 bounded by the cylindrical wall 18 of the liner 16. The gas typically comprises, or consists of, argon. The argon gas may be pumped from an external reservoir (not shown in the figures) into the heating element space 19. From there it flows through the holes 44 into the cavity 12 and on both ends of the cavity, that is, at the opposing end portions 22, 24 of the liner 16 into the surrounding space. By doing so, oxygen is prevented from being present inside the cavity. As a result, undesired deterioration, such as burning of the graphite parts in the device 1 is prevented. The provision of the silica ring 26 connecting the liner 16 to the frame 20, wherein the silica ring 26 protrudes inside the liner 16, defines a gap width between both parts (as explained above) of less than a few millimeters, typically less than 1 millimeter such as a few tenths of a millimeter, also at elevated temperatures, in consideration of the thermal expansion coefficient of graphite being somewhat higher than that of silica as also mentioned above. Such a gap is sufficient to that end, that substantially the entire amount of the argon gas flows in a coordinated manner through the holes 44 and further to outside the cavity. That is, only a minor amount of gas, which may be accurately determined beforehand, flows through the gap between the liner and the ring into the cavity in use. No further sealing means are necessary at the location of the gap between the liner and the ring. The clamping connection between the liner and the frame and the ring and the frame is gas-tight. The heating element space is bounded on its outer side by a cylindrical wall portion 48. On the outside of this wall portion 48 insulating material 46 is provided.

The above described device 1 may form part of a system 50 for forming a core-rod 3 for optical fibers, the system 50 being arranged for collapsing a tube 2 having deposited layers of silica 4, to form the core-rod 3 in use. The system further has a frame 54 onto which two holding elements 56, 58 comprising chucks 60, 62 are provided, of which at least one may be rotatingly driven, the holding elements being configured for holding and jointly rotating about the central axis 5 of the tube. The tube 2 is placed into the system with the two opposed end portions of the tube 2 held by the holding elements. It is noted that the tube may have extended end portions which may be disposed of after the collapsing. The system further comprises a moving device 64, such as a spindle or linear drive, configured for moving, more specifically translating the device 1 in a reciprocating manner along the frame 54 in the axial direction 52. The tube is held by the holding elements such that it passes through the cavity 12 of the device 1, the central axis 5 of the tube 2 coinciding with the central axis 17 of the liner 16 of the device 1. Thus, the device 1 passes along the tube 2 in a reciprocating manner in use of the system 50.

In accordance with an exemplary method according to the invention, for forming a core-rod for optical fibers, using a system 50 as described above, the following steps are carried out:

providing the tube 2 comprising deposited layers of silica 4, holding the tube 2 at two opposed end portions thereof, and such that the tube 2 extends through the cavity 16 of the device 1, heating the tube 2 locally beyond the softening (or melting) temperature by means of generating heat using the heating element 40 of the device 1, moving the tube 2 and the device 1 with respect to each other, using the moving means 64 such that the device 1 can pass along the tube 2 in a reciprocating manner. This may be done while rotating the tube using the at least one rotatable holding element. In FIG. 4, the tube which is being formed into a core-rod is indicated by reference sign 2*. On the left side of the device 1 in the view of FIG. 4, the tube diameter is still larger than on the right side of the device, thereby showing, only for the purpose of explaining the invention, the process of gradually reducing the diameter of the tube so as to finally obtain the core-rod. While the device moves along the tube 2* to the left in FIG. 4, also the diameter of the tube 2* at that location will reduce.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A device for forming a core-rod for optical fibers, the device being arranged for collapsing a tube comprising deposited layers of silica to form the core-rod, the device comprising:
an elongate cavity extending in an axial direction of the device, arranged for allowing the tube to extend through the cavity in use;
an elongate cylindrical liner made of carbon, extending in the axial direction and bounding the cavity with a cylindrical wall thereof, the liner connecting to a frame of the device at opposing end portions of the liner;
a heating element for heating the tube in use, the heating element being provided in an annular heating element space, said heating element surrounding at least a part of the liner, the cylindrical wall of the liner separating the heating element space from the cavity; and
a ring made of a refractory material, fixated to a frame of the device, the ring surrounding a part of a length of the cavity;
wherein the liner is provided such that a cylindrical inner surface portion of the liner at a first end portion of the opposing end portions of the liner mates with a cylindrical outer surface portion of the ring such that the liner can axially move with the first end portion thereof along the outer surface portion of the ring; and
wherein the liner comprises several through holes in the cylindrical wall, via which holes gas may be forced from the heating element space to the cavity.

2. The device according to claim 1, wherein the liner, at a second of the opposing end portions, is fixated to the frame of the device.

3. The device according to claim 2, wherein the liner, at the second end portion, comprises a flange which is clamped to the frame of the device.

4. The device according to claim 1, comprising:
a further ring made of a refractory material, fixated to the frame of the device, the further ring surrounding a part of a length of the cavity;
wherein the liner is provided such that an inner cylindrical surface portion at a second end portion of the opposing end portions mates with an outer cylindrical surface portion of the further ring such that the liner can axially move with the second end portion thereof along the outer surface portion of the further ring.

5. The device according to claim 1, wherein the refractory material is alumina or silica.

6. The device according to claim 1, wherein the ring has a flange which is clamped to the frame of the device.

7. The device according to claim 1, wherein the heating element is of a resistive type.

8. A system for forming a core-rod for optical fibers, the system being arranged for collapsing a tube comprising deposited layers of silica, to form the core-rod in use, wherein the system comprises a device for forming a core-rod according to claim 1, the system further comprising a moving device configured for moving the device with respect to the tube in a reciprocating manner in the axial direction.

9. The system according to claim 8, comprising two holding elements for holding two opposed end portions of the tube, wherein the moving device is configured for moving the device in a reciprocating manner in the axial direction, such that the device passes along the tube in use of the system.

10. The system according to claim 9, wherein the two holding elements are two respective rotatable chucks configured for holding and rotating the tube in use of the system.

11. A device for forming a core-rod for optical fibers, the device being arranged for collapsing a tube comprising deposited layers of silica to form the core-rod, the device comprising:
an elongate cavity extending in an axial direction of the device, arranged for allowing the tube to extend through the cavity in use;
an elongate cylindrical liner made of carbon, extending in the axial direction and bounding the cavity with a cylindrical wall thereof, the liner connecting to a frame of the device at opposing end portions of the liner, wherein the liner has a length-to-diameter ratio in the range of 3 to 10;
a heating element for heating the tube in use, the heating element being provided in an annular heating element space, said heating element surrounding at least a part of the liner, the cylindrical wall of the liner separating the heating element space from the cavity, wherein the liner comprises several through holes in the cylindrical wall, via which holes gas may be forced from the heating element space to the cavity; and
a ring made of a refractory material, fixated to a frame of the device, the ring surrounding a part of a length of the cavity, wherein the liner is provided such that a cylindrical inner surface portion of the liner at a first end portion of the opposing end portions of the liner mates with a cylindrical outer surface portion of the ring such that the liner can axially move with the first end portion thereof along the outer surface portion of the ring; and
a further ring made of a refractory material, fixated to the frame of the device, the further ring surrounding a part of a length of the cavity, wherein the liner is provided such that an inner cylindrical surface portion at a second end portion of the opposing end portions mates with an outer cylindrical surface portion of the further ring such that the liner can axially move with the second end portion thereof along the outer surface portion of the further ring.

12. The device according to claim 11, wherein the liner, at the second end portion, comprises a flange which is clamped to the frame of the device.

13. The device according to claim 11, wherein the ring has a flange which is clamped to the frame of the device.

14. The device according to claim 11, wherein the length of the liner is between 100 millimeters and 500 millimeters.

15. The device according to claim 11, wherein the heating element comprises a plurality of meandering elongate parts along at least a part of the length of the liner.

16. The device according to claim 11, wherein the liner has a length-to-diameter ratio in the range of 6 to 7.

17. The device according to claim 11, wherein a tube comprising deposited layers of silica is centrally positioned within the liner such that an annular gap between the tube and the cylindrical wall of the liner is between 2 millimeters and 10 millimeters.

18. A system for forming a core-rod for optical fibers, the system being arranged for collapsing a tube comprising deposited layers of silica to form the core-rod in use, wherein the system comprises (i) a device for forming a core-rod for optical fibers, the device being arranged for collapsing a tube comprising deposited layers of silica to form the core-rod, and (ii) a moving device configured for moving the device with respect to the tube in a reciprocating manner in the axial direction, wherein the device comprises:

an elongate cavity extending in an axial direction of the device, arranged for allowing the tube to extend through the cavity in use;

an elongate cylindrical liner made of carbon, extending in the axial direction and bounding the cavity with a cylindrical wall thereof, the liner connecting to a frame of the device at opposing end portions of the liner;

a heating element for heating the tube in use, the heating element being provided in an annular heating element space, said heating element surrounding at least a part of the liner, the cylindrical wall of the liner separating the heating element space from the cavity; and a ring made of a refractory material, fixated to a frame of the device, the ring surrounding a part of a length of the cavity;

wherein the liner is provided such that a cylindrical inner surface portion of the liner at a first end portion of the opposing end portions of the liner mates with a cylindrical outer surface portion of the ring such that the liner can axially move with the first end portion thereof along the outer surface portion of the ring.

19. The system according to claim 18, comprising two holding elements for holding two opposed end portions of the tube, wherein the moving device is configured for moving the device in a reciprocating manner in the axial direction, such that the device passes along the tube in use of the system.

* * * * *